(12) United States Patent
Lee

(10) Patent No.: US 9,008,083 B2
(45) Date of Patent: Apr. 14, 2015

(54) NETWORK INTERMEDIATE APPARATUS AND METHOD FOR UBIQUITOUS NETWORK AND UBIQUITOUS NETWORK SYSTEM USING THE INTERMEDIARY APPARATUS

(75) Inventor: Seung-Tak Lee, Daejeon (KR)

(73) Assignee: KT Corporation, Seongnam-Si (KR)

( * ) Notice: Subject to any disclaimer, the term of this patent is extended or adjusted under 35 U.S.C. 154(b) by 60 days.

(21) Appl. No.: 13/281,541

(22) Filed: Oct. 26, 2011

(65) Prior Publication Data

US 2012/0099595 A1 Apr. 26, 2012

Related U.S. Application Data

(63) Continuation of application No. 12/440,959, filed as application No. PCT/KR2006/003645 on Sep. 13, 2006, now abandoned.

(51) Int. Cl.
*H04L 12/701* (2013.01)
*H04L 12/741* (2013.01)
*H04W 84/22* (2009.01)

(52) U.S. Cl.
CPC ............. *H04L 45/00* (2013.01); *H04W 84/22* (2013.01); *H04L 45/745* (2013.01)

(58) Field of Classification Search
CPC ... H04W 84/12; H04W 84/22; H04W 76/022; H04L 45/54; H04L 45/72; H04L 45/745; H04L 49/354
USPC ........... 370/310, 315, 338, 389, 395.2, 395.3, 370/401, 409
See application file for complete search history.

(56) References Cited

U.S. PATENT DOCUMENTS

| 6,055,236 | A | 4/2000 | Borella et al. | |
| 6,591,306 | B1 * | 7/2003 | Redlich ...................... | 709/245 |
| 2002/0027906 | A1 * | 3/2002 | Athreya et al. .............. | 370/386 |
| 2002/0154613 | A1 | 10/2002 | Shahrier | |
| 2004/0264505 | A1 * | 12/2004 | Miki et al. .................. | 370/469 |
| 2006/0062187 | A1 * | 3/2006 | Rune .......................... | 370/338 |

FOREIGN PATENT DOCUMENTS

| EP | 1017206 | 7/2000 |
| KR | 1020030083526 | 10/2003 |
| KR | 1020050026752 | 3/2005 |
| KR | 1020060046899 | 5/2006 |
| WO | 03058924 | 7/2003 |
| WO | 2004006503 | 1/2004 |

* cited by examiner

*Primary Examiner* — Un C Cho
*Assistant Examiner* — Jeremy Costin
(74) *Attorney, Agent, or Firm* — Lexyoume IP Meister, PLLC

(57) ABSTRACT

Discloses is an ubiquitous network intermediate apparatus and intermediate method that supports various internet services in order that wired terminals can connect to the network without an additional network setting. An ubiquitous network intermediate apparatus according to the present invention comprises a terminal access device outputting a packet received from a terminal according to a source IP address of the packet to a preset virtual path, and outputting a response packet received through the virtual path to the terminal; and a home access device outputting the packet received from the terminal access device through the virtual path to a home router, and transmitting the response packet received from the home router to the terminal access device through the virtual path according to a destination IP address.

18 Claims, 3 Drawing Sheets

NETWORK INTERMEDIATE APPARATUS AND METHOD FOR UBIQUITOUS NETWORK AND UBIQUITOUS NETWORK SYSTEM USING THE INTERMEDIARY APPARATUS

CROSS-REFERENCES TO RELATED APPLICATION

This application is a Continuation application of U.S. patent application Ser. No. 12/440,959, which was filed on Mar. 12, 2009, which is a National Stage application of PCT/KR06/03645 filed on Sep. 13, 2006, the contents of which are incorporated herein by reference.

TECHNICAL FIELD

The present invention relates to an ubiquitous network, more particularly, to an ubiquitous network intermediate apparatus and intermediate method that supports various broadband services in order that wired terminals can connect to a wired network without an additional network setting.

BACKGROUND ART

An ubiquitous network refers to the network in which a subscriber can be provided with various broadband services such as Internet, an Internet protocol IP communications, by connecting to a network in anytime, anywhere. For instance, the ubiquitous network has a mobile radio communications network. While mobile communications network subscribers can talk over the telephone with a desired person in anytime, in anywhere by using a mobile phone, recently, they can be variously provided with the internet connection and application services.

However, the mobile radio communications network is configured as telephone network according to the voice communications of the narrow band. Therefore, there is a limit in configuring the ubiquitous network by using the mobile radio communications network. That is, there is a problem in that the broadband service is limited in providing the service since the mobile radio communications network has the limit of the frequency bandwidth for providing the internet service, and a considerable cost has to be paid due to the use of the expensive frequency channels.

A portable Internet has appeared so as to solve such a problem. The portable Internet can provide the internet access service of broadband with low cost. The portable Internet introduced the concept of a home agent in which a terminal was subscribed and a foreign agent in order to have a portability. In normal cases, the terminal accesses to the home agent, and the home agent performs the routing processing for the packet sent to the terminal and received from the terminal. In the mobile environment, the terminal accesses to the foreign agent. However, the foreign agent performs the role of only transferring the packet of the terminal to the home agent. In conclusion, the home agent processes all packets.

However, as to such mode, the radio communications between a base station and a mobile terminal is focused, but the cable communications between them is not dealt at all. In addition, the home agent and all foreign agents are to be connected to the wired channel. Therefore, the technical matters of the wired network side have to be solved in order that logical tunnels between all agents are formed and agents can be connected by cable.

DISCLOSURE

Technical Problem

Accordingly, an object of the present invention is to solve at least the problems and disadvantages of the related art. The object of the present invention is to provide a communications service by accessing to a broadband internet without an additional network setting in a wired network in which all circuit infra is already equipped.

Technical Solution

In order to accomplish the object, according to the present invention, provided is an ubiquitous network intermediate apparatus comprising a terminal access device outputting a packet received from a terminal according to a source IP address of the packet to a preset virtual path, and outputting a response packet received through the virtual path to the terminal; and a home access device outputting the packet received from the terminal access device through the virtual path to a home router, and transmitting the response packet received from the home router to the terminal access device through the virtual path according to a destination IP address of the response packet. According to the present invention, provided is an ubiquitous network system comprising one or more home routers that perform a routing in order that terminals which are connected to an internet network are able to communicate with a service server on the internet network; and a network intermediate apparatus that transmits a packet received from the terminal to the corresponding home router by classifying the packet according to a source IP address of the packet, and transmits a response packet received from the home router to the corresponding terminal by classifying the response packet according to a destination IP address of the response packet.

BEST MODE

Figure 1:
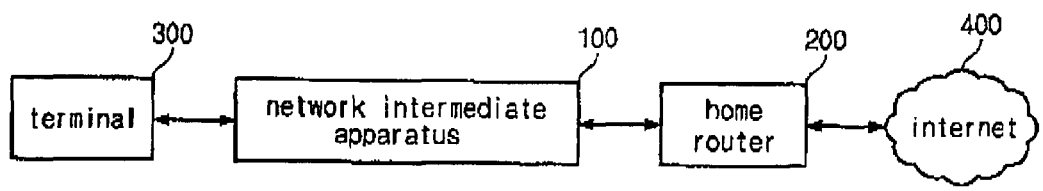
FIG. 1 is a configuration diagram of an ubiquitous network system according to the present invention.

FIG. 1 is a configuration diagram of an ubiquitous network system according to the present invention.

The ubiquitous network system of FIG. 1 provides a network intermediate apparatus 100 and a home router 200. The network intermediate apparatus 100 forms a virtual path of in the base of IP address between a user terminal 300 and the home router 200, and mediates the packet transmission between the home router 200 and the terminal 300. That is, all terminals 300 send and receive the packets through the home router 200. Therefore in case a packet is received from the terminal 300 irrespective of the access location of the terminal 300, the network intermediate apparatus 100 classifies the packet based on source IP address and transmits it to the specific home router 200 in which the corresponding terminal 300 is registered. In case the response packet is received from the home router 200, the network intermediate apparatus 100 classifies it according to the destination IP address and transmits it to the corresponding terminal 300. For this, the network intermediate apparatus 100 forms virtual paths in advance by IP subnet managed by each home router 200. The network intermediate apparatus 100 stores the connection information for the virtual path, the home router 200 and the terminal 300 based on the IP address of the terminal 300.

The home router 200 manages the terminal 300 by the preset specific IP subnet and performs the routing function in order that the terminal 300 which has the IP address belonging to the IP subnet that the home router 200 manages is capable of communicating with service servers (not shown) of other network through Internet network 400. That is, the home router 200 does not manage each terminal IP address, but manages it by the IP subnet. Since the function of the home router 200 is similar to that of the conventional router other than the routing function using the IP subnet, the more detailed description will be omitted.

Figure 2:
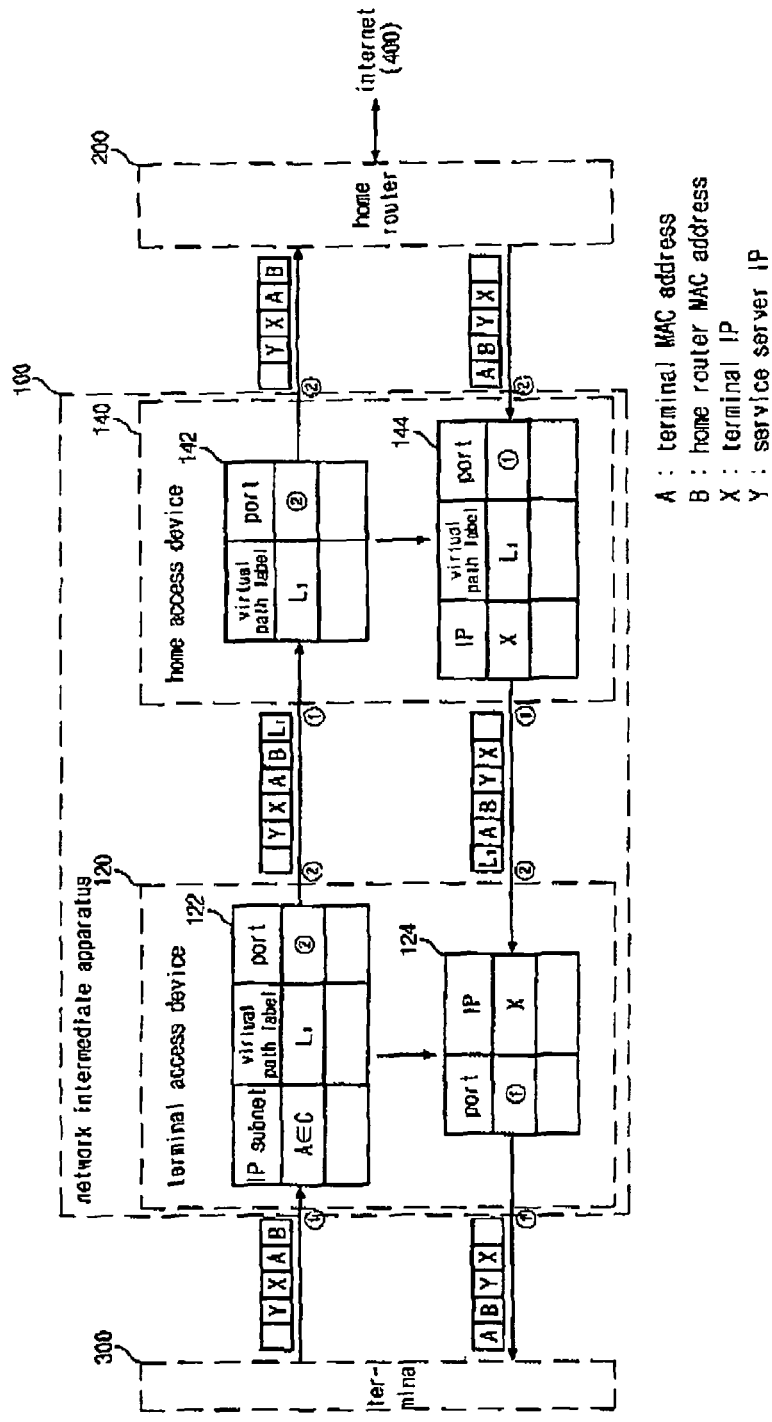
FIG. 2 is a configuration diagram showing the configuration of the network intermediate apparatus of FIG. 1 in detail.

FIG. 2 is a configuration diagram showing the configuration of the network intermediate apparatus of FIG. 1 in detail.

The network intermediate apparatus 100 provides a terminal access device 120 and a home access device 140. At this time, the terminal access device 120 and the home access device 140 are connected by the virtual paths which are preset by the IP subnet that is managed by each home router 200 to send and receive a packet. At this time, any conventional technology may be acceptable for the method for forming the virtual path.

In case a packet is received from the terminal 300, the terminal access device 120 determines the virtual path in which the corresponding packet is transmitted by using the source IP address of the received packet and a network lookup table which is set in advance, and transmits a packet through the corresponding virtual path to the home access device 140. At the same time, the terminal access device 120 matches the information of port in which the corresponding packet is inputted with the source IP address of the corresponding packet and stores the matched data in an access look up table 124. Additionally, in case a packet is received from the home access device 140 through the virtual path, the terminal access device 120 transmits the corresponding packet to the terminal 300 by using the destination IP address of the received packet and the access look up table 124. At this time, in the network look up table 122, the IP subnet managed in each home router 200, the virtual path label for the virtual path configured between the terminal access device 120 and the home access device 140 by the IP subnet, and the information of port connected to the virtual path are stored, while they are matched with each other. The information stored in the network look up table 122 is the preset information and is uniformly maintained, except of being changed by a system administrator. Additionally, whenever a packet is inputted from the terminal 300, the source IP address of the inputted packet and the information of port in which the corresponding packet is received are temporarily recorded in the access look up table 124, while they are matched with each other.

In case a packet is received through the virtual path from the terminal access device 120, the home access device 140 transmits the packet which is received to the home router 200 by using the information for the virtual path in which the packet is received and the access look up table 142 which is set in advance. At the same time, the home access device 140 matches the source IP address of the packet received through the virtual path from the terminal access device 120, the virtual path label for the virtual path in which the corresponding packet is received and the information of port connected to the corresponding virtual path and records the matched data in the network look up table 144. Additionally, in case a packet is received from the home router 200, the home access device 140 determines the virtual path in which the packet is transmitted by using the destination IP address of the received packet and the network look up table 144, and transmits the corresponding packet to the terminal access device 120 through the determined virtual path. At this time, in the access look up table 142, the virtual path label for the virtual path formed between the terminal access device 120 and the home access device 140 and the information of port connected to the home router 200 corresponded to the virtual path label are matched and stored. The information stored in the access look up table 142 is the preset information and is uniformly maintained except the case of changing by the system administrator. In addition, in the network look up table 144, whenever a packet is inputted from the terminal access device 120, the source IP address of the packet which is inputted through the virtual path from the terminal access device 120, the virtual path label for the virtual path in which the corresponding packet is received and the port information connected to the corresponding virtual path are matched and temporarily recorded.

Figure 3:
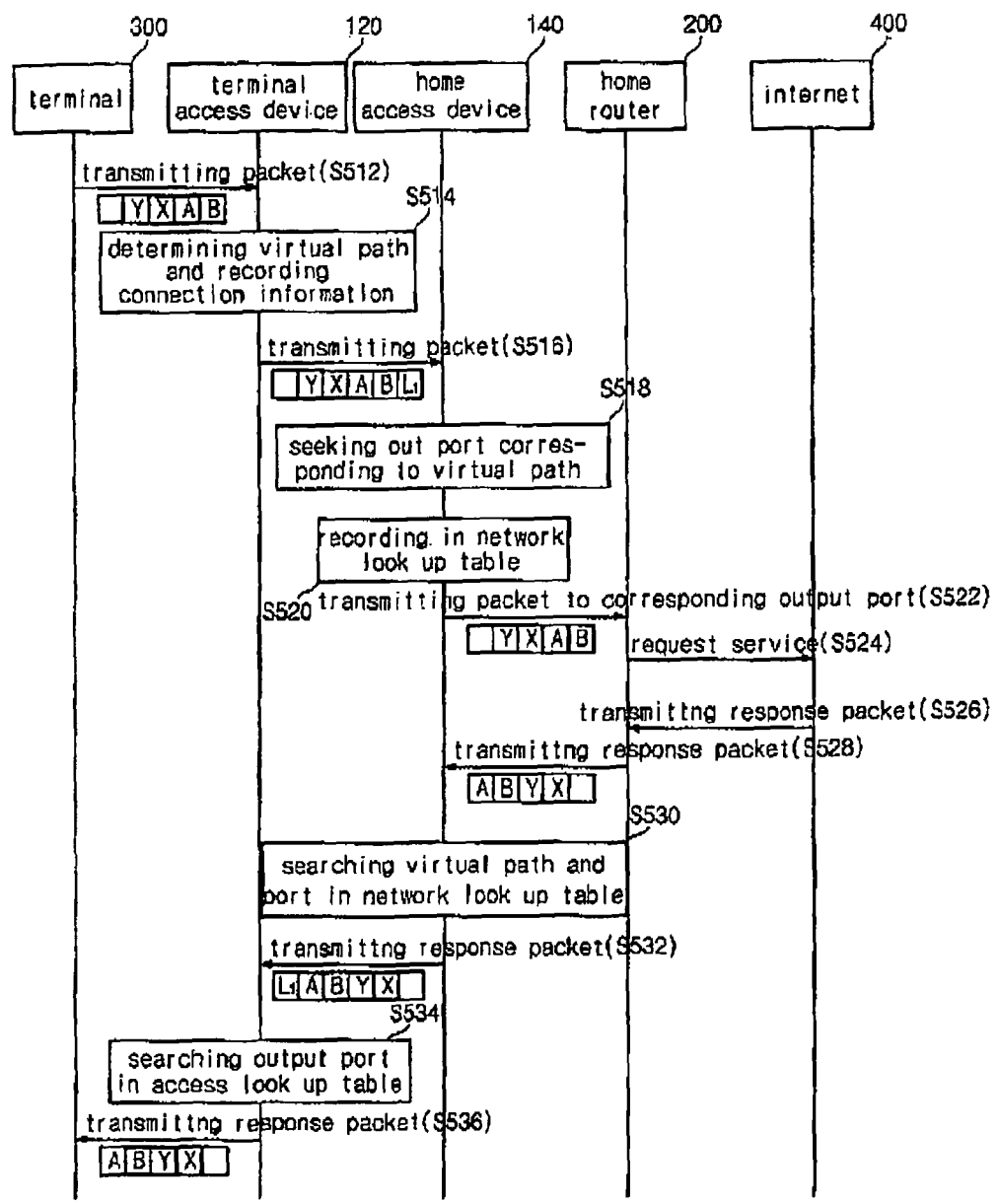
FIG. 3 is a flowchart for illustrating the operation method of the ubiquitous network system according to the present invention.

FIG. 3 is a flowchart for illustrating the method of the network immediate according to the present invention by using the configuration of FIG. 2. The network intermediate method according to the invention is explained by using FIG. 2 and FIG. 3.

The packet outputted from the terminal 300 is delivered to the terminal access device 120 of the network intermediate apparatus 100(S512). At this time, the source MAC address and the source IP address of the packet outputted from the terminal 300 is the MAC address A and the IP address X of the terminal 300. The destination MAC address and the destination IP address of a packet respectively are the MAC address B of home router 200 and the IP address Y of the service server (not shown) to which the terminal 300 finally connects for receiving a service.

After seeking out the IP subnet C to which the source IP address X of the corresponding packet belongs by analyzing the packet inputted from the terminal 300, the terminal access device 120 determines the virtual path through which a packet is transmitted by using the IP subnet C and the preset network look up table 122. The terminal access device 120 records the connection information with the terminal 300 outputting the corresponding packet in the access look up table 124(S514).

That is, the terminal access device 120 finds the virtual path corresponding to the IP subnet C and an output port ② connected to the corresponding virtual path by using the connection information stored in the network look up table 122. At this time, the virtual path between the home access device 140 and the terminal access device 120 is formed in advance by IP subnet which is managed by each home router 300, while the connection information with the virtual path is stored in the network look up table 122 in advance.

The terminal access device 120 matches the source IP address X of the packet inputted from the terminal 300 with the port information ① in which the corresponding packet is inputted and records the matched data in the access look up table 124. At this time, the connection information recorded in the access look up table 124 is used when the packet received from the home access device 140 is transmitted to the specific terminal 300.

Next, the terminal access device 120 transmits a packet to the home access device 140 through the corresponding virtual path after attaching the label L1 for the virtual path determined at step 514 to the packet (S516). The home access device 140 seeks out the virtual path label adhered to a packet by analyzing the received packet when the packet is received through the virtual path, thereafter, comparing it with the preset information in the access look up table 142 to find out the output port ② transmitting the corresponding packet to the home router 200(S518).

The home access device 140 records the connection information with the terminal access device 120 for the corresponding packet in the network look up table 144(S520). That is, the home access device 140 matches the source IP address X of the packet received from the terminal access device 120, the virtual path label L1 for the virtual path in which the corresponding packet is transmitted, and the port ① information in which the corresponding packet is inputted, and records the matched data in the network look up table 144. At this time, the connection information recorded in the network look up table 144 is used when the packet received from the home router 200 is transmitted to the terminal access device 120 through the specific virtual path. At this time, it may be acceptable that the sequence of steps 518 and 520 can be reversed.

Then, after removing the virtual path label L1 from the packet, the home access device 140 delivers the corresponding packet to the home router 200 through the output port ② which was found out at step 518 (S522). The home router 200 performs a routing to transmit the packet to the internet network 400 in order that the packet is delivered to the corresponding service server (not shown) according to the destination IP address Y of the received packet (S524). At this time, the routing function of the home router 200 is the same as the routing function of conventional routers.

In case the response packet for the packet which the service server (not shown) transmitted at step 524 is received (S526), the home router 200 transmits it to the home access device 140(S528). At this time, the source MAC address of the response packet transmitted to the home access device 140 is the MAC address B of the home router 200, and the source IP address is the IP address Y of the service server (not shown). Additionally, the destination MAC address and the destination IP address of the packet are the MAC address A of the terminal 300 and IP address X of the terminal 300.

The home access device 140 analyzes the response packet received from the home router 200 and finds out the destination IP address of the corresponding packet. Thereafter, the home access device 140 examines whether the same IP as the destination IP address of the response packet is recorded in the network look up table 144 or not, and searches the virtual path and the port in which the response packet is transmitted (S530). Then, the home access device 140 transmits the response packet to the terminal access device 120 through the corresponding virtual path by outputting the corresponding response packet to the searched port ① after adhering the label L1 for the searched virtual path to the response packet (S532).

At this time, the port ① and the virtual path in which the response packet is transmitted is the port and the virtual path in which the packet was received from the terminal access device 120 at step 516. The terminal access device 120 and the home access device 140 send and receive the packets for the same terminal 300 through the same virtual path which is set in advance.

The terminal access device 120 that received the response packet through the virtual path searches the output port corresponding to the IP address, after finding out the same IP address as the destination IP address of the response packet in the access look up table 124(S534). Then, the terminal access device 120 removing the virtual path label L1 in the response packet, outputting the corresponding response packet to the searched output port ① for transmitting to the terminal 300 (S536).

That is, the packet having source IP address which is the same IP address and the response packet for the packet are transmitted through the same virtual path. As described in the above, one virtual path is provided by each IP subnet, thereby, the bidirectional communication can be performed through the corresponding virtual path. That is, the same virtual path label L1 is endowed to the packet having source IP address which is the same IP address and the response packet for the packet such that the bidirectional communication can be performed through the same virtual path.

However, different labels and virtual paths can be provided according to the progressive direction of the packet. Further, while the bidirectional communication is performed through one virtual path, a main path and a redundant path are set up so as to enhance the survivability of the packet, thereby, the packet can be transmitted through the redundant path when an abnormal situation is occurred in the main path. In the above-described embodiment of FIG. 2, the terminal access device 120 is directly connected to the terminal 300. However, in order to accommodate the more terminal 300, a terminal accommodation apparatus (not shown) can be additionally included between the terminal 300 and the terminal access device 120.

INDUSTRIAL APPLICABILITY

According to the present invention, the network intermediate apparatus is capable of providing a broadband internet service in any place where LAN connection is possible by connecting to internet network without additional network setting. Further, a home router can set up an IP network by a large subnet unit in each port such that the management of IP address can be easy, and, accordingly, the routing table in the internet network can be simplified and the stability of the internet network can be increased. In conclusion, since IP is managed by the subnet unit, various personalization services can be easily processed in a home router base, and the service differentiation according to the IP addressing is possible such that the communications common carrier is able to decrease the cost and increase the amount of sales.

The invention claimed is:

1. An ubiquitous network intermediate apparatus comprising:
    a terminal access device configured to transmit a packet received from a terminal to a home access device through a preset virtual path, by using a source IP address of the packet and a first network look up table, configured to store information including the source IP address of the packet in a first access look up table, configured to transmit a response packet received through the preset virtual path from the home access device to the terminal, by using a destination IP address of the response packet and the first access look up table, and configured to store a preset virtual path label for the preset virtual path configured between the terminal access device and the home access device in the first network look up table; and
    the home access device configured to transmit the packet received through the preset virtual path from the terminal access device to a home router, by using information for the preset virtual path and a second access look up table, configured to store information including the source IP address of the packet in a second network look up table, configured to transmit the response packet received from the home router to the terminal access device through the preset virtual path, by using the destination IP address of the response packet and second network look up table, and configured to store the preset virtual path label for the preset virtual path configured between the terminal access device and the home access device in the second access look up table, wherein the terminal access device includes the first network look up table and the first access look up table, wherein the home access device includes the second network look up table and the second access look up table, wherein the packet and the response packet are transmitted through the preset virtual path configured between the terminal access device and the home access device, by using the source and destination IP addresses, the first and second access look UP tables, and the first and second network look up tables, wherein the packet received from the terminal includes an IP address of the terminal as the source IP address of the packet and a MAC address of the terminal as a source MAC address of the packet, and includes an IP address of a service server as a destination IP address of the packet and a MAC address of the home router as a destination MAC address of the packet, wherein the response packet received from the home router includes the IP address of the service server as a source IP address of the response packet and the MAC address of the home router as a source MAC address of the response packet, and includes the IP address of the terminal as the destination IP address of the response packet and the MAC address of the terminal as a destination MAC address of the response packet, and wherein the terminal is provided various broadband services by accessing to a broadband Internet through the preset virtual paths between the terminal and the home router, based on the IP addresses and the MAC addresses included in the packet and the response packet, without an additional network setting in order to connect to a wired network.

2. The ubiquitous network intermediate apparatus of claim 1, wherein the terminal access device, for the packet received from the terminal, transmits the packet through the preset virtual path after seeking the preset virtual path corresponding to the IP subnet to which the source IP address belongs and a port connected to the preset virtual path in the first network look up table, and matches the connection information of port in which the packet is received with the source IP address to temporarily record the matched connection information in the first access look up table.

3. The ubiquitous network intermediate apparatus of claim 2, wherein the terminal access device, for the response packet received from the home access device, seeks the port corresponding to the destination IP address of the response packet in the first access look up table, and outputs the response packet to the port.

4. The ubiquitous network intermediate apparatus of claim 1, wherein the home access device, for the packet received through the preset virtual path, seeks port corresponding to the preset virtual path in the second access look up table, and outputs the packet to the port, and matches the preset virtual path for the packet and connection information of the port connected to the preset virtual path with the source IP address of the packet to temporarily record the matched connection information in the second network lookup table.

5. The ubiquitous network intermediate apparatus of claim 4, wherein the home access device, for the response packet received from the home router, transmits the response packet through the preset virtual path after seeking the preset virtual path corresponding to the destination IP address of the response packet and the connection information of port connected to the preset virtual path in the second network look up table.

6. An ubiquitous network system comprising:
a home router configured to perform a routing in order to transmit a packet received from the terminals to an internet network; and
a network intermediate apparatus configured to transmit the packet received from the terminals to the home router by classifying the packet according to a source IP address of the packet, and configured to transmit a response packet received from the home router to the terminals by classifying the response packet according to a destination IP address of the response packet,
wherein the network intermediate apparatus comprises:
a terminal access device configured to transmit the packet received from the terminals to a home access device through a virtual path, by using the source IP address of the packet and a first network look up table, and configured to transmit the response packet received through the virtual path from the home access device to the terminals, by using a destination IP address of the response packet and a first access look up table,
wherein the terminal access device includes the first network look up table and the first access look up table,
wherein the first network look up table stores a virtual path label for the virtual path configured between the terminal access device and the home access device,
wherein the first access look up table stores information including the source IP address of the packet,
wherein the packet and the response packet are transmitted through the preset virtual path configured between the terminal access device and the home access device, by using the source and destination IP addresses, the first and second access look UP tables, and the first and second network look up tables,
wherein the packet received from the terminal includes an IP address of the terminal as the source IP address of the packet and a MAC address of the terminal as a source MAC address of the packet, and includes an IP address of a service server as a destination IP address of the packet and a MAC address of the home router as a destination MAC address of the packet,
wherein the response packet received from the home router includes the IP address of the service server as a source IP address of the response packet and the MAC address of the home router as a source MAC address of the response packet, and includes the IP address of the terminal as the destination IP address of the response packet and the MAC address of the terminal as a destination MAC address of the response packet, and
wherein the terminal is provided various broadband services by accessing to a broadband Internet through the preset virtual paths between the terminal and the home router, based on the IP addresses and the MAC addresses included in the packet and the response packet, without an additional network setting in order to connect to a wired network.

7. The ubiquitous network system of claim 6, wherein the home router performs the routing for the terminals having an IP address belonging to an IP subnet which is managed by the home router.

8. The ubiquitous network system of claim 7, wherein the network intermediate apparatus forms the virtual path by the IP subnet.

9. The ubiquitous network system of claim 8, wherein the network intermediate apparatus transmits the packet from the terminals to the home router by using the connection information among the terminals, the virtual path and the home router, and transmits the response packet received from the home router to the terminals through the virtual path in which the packet having the source IP address which is the destination IP address of the response packet is transmitted.

10. The ubiquitous network system of claim 9, wherein the network intermediate apparatus further comprises:
the home access device configured to transmit the packet received through the virtual path from the terminal access device to the home router, by using information for the virtual path and a second access look up table, and configured to transmit the response packet received from the home router to the terminal access device through the virtual path, by using the destination IP address and second network look up table,
wherein the home access device includes the second network look up table and the second access look up table,
wherein the second network look up table stores information including the source IP address of the packet,
wherein the second access look up table stores the virtual path label for the virtual path configured between the terminal access device and the home access device.

11. The ubiquitous network system of claim 10, wherein the terminal access device, for the packet received from the terminals, transmits the packet through the virtual path after seeking the virtual path corresponding to the source IP address of the packet and port information connected to the virtual path in the first network look up table, and matches the connection information of port in which the packet is received with the source IP address to record the matched connection information in the first access look up table.

12. The ubiquitous network system of claim 11, wherein the terminal access device, for the response packet received from the home access device, seeks a port corresponding to the destination IP address of the response packet in the first access look up table, and outputs the response packet to the port.

13. The ubiquitous network system of claim 10, wherein the home access device, for the packet received through the virtual path, seeks port corresponding to the virtual path in the second access look up table, and outputs the packet to the port, and matches the virtual path for the packet and connection information of the port connected to the virtual path with the source IP address of the packet to record the matched connection information in the second network lookup table.

14. The ubiquitous network system of claim 10, wherein the home access device, for the response packet received from the home router, transmits the response packet through the virtual path after seeking the virtual path corresponding to the destination IP address of the response packet and the information of port connected to the virtual path at the second network look up table.

15. An ubiquitous network intermediate method comprising:
a first step of receiving a packet from terminals, classifying the packet according to a source IP address of the packet, transmitting the packet to a home router through a virtual path by using the source IP address of the packet, a first network look up table, information for the virtual path, and a second access look up table, and storing information including the source IP address of the packet in a first access look up table and a second network look up table; and
a second step of receiving a response packet corresponding to the packet from the home router through the virtual path, transmitting the response packet to the terminals, by using a destination IP address of the response packet, the first access look up table, and second network look up table, and storing a virtual path label for the virtual path configured between the terminals and the home router in the first network look up table and the second access look up table,
wherein the packet and the response packet are transmitted through the virtual path configured between the terminals and the home router, by using the source and destination IP addresses, the first and second access look up tables, and the first and second network look up tables,
wherein the packet received from the terminal includes an IP address of the terminal as the source IP address of the packet and a MAC address of the terminal as a source MAC address of the packet, and includes an IP address of a service server as a destination IP address of the packet and a MAC address of the home router as a destination MAC address of the packet,
wherein the response packet received from the home router includes the IP address of the service server as a source IP address of the response packet and the MAC address of the home router as a source MAC address of the response packet, and includes the IP address of the terminal as the destination IP address of the response packet and the MAC address of the terminal as a destination MAC address of the response packet, and
wherein the terminal is provided various broadband services by accessing to a broadband Internet through the preset virtual paths between the terminal and the home router, based on the IP addresses and the MAC addresses included in the packet and the response packet, without an additional network setting in order to connect to a wired network.

16. The ubiquitous network intermediate method of claim 15, wherein the packet from the terminals and the response packet from the home router are transmitted through the virtual path formed between the terminals and the home router by an IP subnet that the home router manages.

17. The ubiquitous network intermediate method of claim 16, wherein, in the first step, the packet is transmitted to the home router through the virtual path corresponding to the IP subnet to which the source IP address of the packet belongs, while port in which the packet is received from the terminals and information for the virtual path in which the packet is transmitted are matched with the source IP to record.

18. The ubiquitous network intermediate method of claim 17, wherein, in the second step, the response packet is transmitted to the terminals through the virtual path and the port corresponding to the source IP address after searching the source IP address coinciding with the destination IP address of the response packet.

* * * * *